United States Patent
Pojar

Patent Number: 6,164,782
Date of Patent: Dec. 26, 2000

[54] SELF-CONTAINED LIGHTED MARKING DEVICE

[75] Inventor: Stephen J. Pojar, Scandia, Minn.

[73] Assignee: 3M Innovative Property Company, St. Paul, Minn.

[21] Appl. No.: 08/760,130

[22] Filed: Dec. 3, 1996

Related U.S. Application Data

[63] Continuation of application No. 08/317,477, Oct. 4, 1994, abandoned.

[51] Int. Cl.[7] .................................... G02B 5/12
[52] U.S. Cl. ................. 359/528; 359/527; 359/529; 359/530; 362/243; 362/183; 362/339
[58] Field of Search .................. 359/527, 528, 359/529, 530, 532, 538, 551; 362/243, 183, 339, 340, 276; 385/133

[56] References Cited

U.S. PATENT DOCUMENTS

| | | | |
|---|---|---|---|
| 3,830,682 | 8/1974 | Rowland | 359/530 |
| 4,234,906 | 11/1980 | Schindler | 362/339 |
| 4,260,220 | 4/1981 | Whitehead | 385/133 |
| 4,615,579 | 10/1986 | Whitehead | 385/133 |
| 4,787,708 | 11/1988 | Whitehead | 385/133 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 4,906,070 | 3/1990 | Cobb, Jr. | 359/834 |
| 4,912,605 | 3/1990 | Whitehead | 362/32 |
| 4,952,023 | 8/1990 | Bradshaw et al. | 359/529 |
| 4,983,436 | 1/1991 | Bailey et al. | 359/538 |
| 4,984,144 | 1/1991 | Cobb, Jr. et al. | 362/339 |
| 4,996,632 | 2/1991 | Aikens | 362/32 |
| 5,016,143 | 5/1991 | Aikens | 362/32 |
| 5,040,883 | 8/1991 | Cobb, Jr. | 359/747 |
| 5,043,850 | 8/1991 | Dreyer, Jr. | 362/26 |
| 5,056,892 | 10/1991 | Cobb, Jr. | 359/831 |
| 5,122,939 | 6/1992 | Kazdan et al. | 359/528 |
| 5,190,370 | 3/1993 | Miller et al. | 362/340 |
| 5,258,896 | 11/1993 | Dreyer, Jr. | 362/307 |

FOREIGN PATENT DOCUMENTS

| | | | |
|---|---|---|---|
| 0 290 267 A2 | 11/1988 | European Pat. Off. | F21V 8/00 |
| 0 292 159 | 11/1988 | European Pat. Off. | G02B 5/122 |
| 89 09 067 U | 1/1990 | Germany | F21V 8/00 |
| 4-110988 | 4/1992 | Japan | B61L 29/04 |
| WO94/06051 | 3/1994 | WIPO | G02F 1/1335 |

*Primary Examiner*—Cassandra Spyrou
*Assistant Examiner*—Mohammad Y. Sikder
*Attorney, Agent, or Firm*—Stephen W. Buckingham

[57] ABSTRACT

A self-contained lighted marking device that is a directionally dependent line light source has a substantially transparent housing. The housing has a narrow cross-section, preferably rectangular in shape. A thin, flexible film having a smooth surface on one side and a plurality of linear substantially right angled isosceles prisms on the other side is located along the periphery of the interior of the housing. A light source, preferably a plurality of light emitting diodes, are located at at least one end of the housing.

20 Claims, 5 Drawing Sheets

SELF-CONTAINED LIGHTED MARKING DEVICE

This application is a continuation of Ser. No. 08/317,477 filed Oct. 4, 1994, abandoned.

FIELD OF THE INVENTION

The present invention generally relates to the field of marking apparatuses, such as for use with traffic lanes. In particular, the invention is directed to a self-contained lighted marking device that is a directionally dependent line light source.

BACKGROUND OF THE INVENTION

Traffic lanes are delineated by using pavement markings, retroreflective markers, point source lamps, and recently, lighted guidance tubes. Painted pavement markings are often difficult for drivers to see at night, so retroreflective markers have been developed to improve the ability of the drivers to locate and see the markers. While retroreflective markers retroreflect incident light, they do not provide any illumination. For some applications, such as marking railroad crossings or construction work zones, illumination is desirable, possibly used in conjunction with retroreflective markings, to increase the ability of drivers to see the marked area. For example, gate arms, particularly at railroad crossings, are marked with diagonal stripes, typically alternating red and white. The stripes are painted or are retroreflective sheeting. Red steady burn or flashing lights often accompany the gate arms. Construction barricades also typically are marked with diagonal stripes. Red or orange lights are often mounted on top of the barricades. The lights mounted on top typically have a life of ten to twenty days, depending on the time of year, and for flashing lights, two to three months. The lights usually run on two six-volt lantern batteries.

Illumination, in the form of lighted guidance tubes, has also been used to mark roadways. Lighted guidance tubes utilize a thin, flexible film made of a transparent polymeric material having a structured surface and a smooth surface, wherein light striking either surface is totally internally reflected. An example of this type of film is described in commonly-assigned U.S. Pat. No. 4,906,070 to Cobb, Jr. An example of a lighted guidance tube is described in commonly-assigned U.S. Pat. No. 4,805,984 to Cobb, Jr. For lighted guidance tubes, a circular cross-sectional shape is used for superior light transport characteristics, to allow maximum distance between light sources. Because of the desire to illuminate as great a length as possible, highly collimated halogen light sources are usually used. These light sources, however, have low efficiency and a short life span. It is often preferable to use the lighted guidance tubes for poorly lit roadways, to ensure the driver can adequately follow the roadways. Often, however, it is difficult or uneconomical to provide electrical power for the light sources in the lighted guidance tubes in remote areas or where only a short delineation system is required.

SUMMARY OF THE INVENTION

To overcome the limitations in the prior art described above, and to overcome other limitations that will become apparent upon reading and understanding the present specification, the present invention provides a self-contained lighted marking device that is a directionally dependent light source. The self-contained lighted marking device has a substantially transparent housing having a narrow cross-section, preferably rectangular. Inside the housing, a thin, flexible film having a smooth surface on one side and a plurality of linear substantially right angled isosceles prisms on the other side is placed substantially along the periphery of the interior of the housing. A light source is placed at the end of the end of the housing. Preferably, the light source comprises a plurality of light emitting diodes.

BRIEF DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

Figure 1:
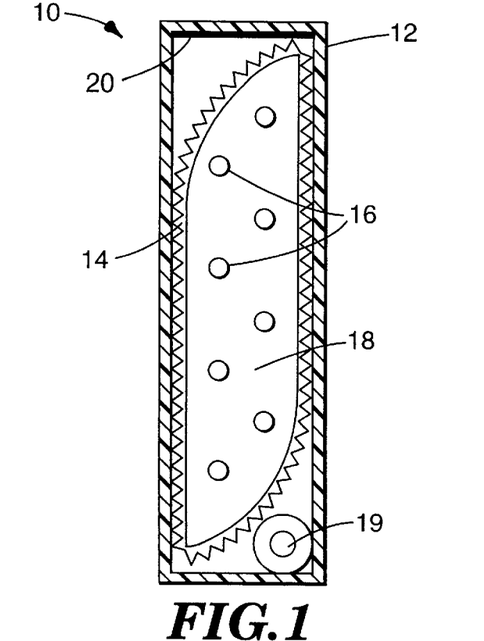
FIG. 1 is a side cross-sectional view of the present invention configured for guidance applications.

To overcome the limitations in the prior art described above, and to overcome other limitations that will become apparent upon reading and understanding the present specification, the present invention provides a self-contained lighted marking device. The marking device may be used for traffic lane delineation, for marking obstacles, such as barricades or gate arms, to increase the conspicuousness of vehicles as well as decorative accent lighting. Referring to FIG. 1, a cross-sectional view of a first embodiment of the present invention is shown. The first embodiment is particularly useful for guidance-type applications, as light is directed at shallow angles out of the device, as will later be described. Guidance device 10 has substantially transparent outer housing 12, preferably made of polycarbonate, although any rigid, substantially transparent material may be used. Outer housing 12 is tubular in form and preferably has a rectangular cross-sectional shape. The cross-sectional shape, however, may be any cross-sectional shape having a relatively narrow cross-section.

Optical film 14, with a microstructured surface, is placed substantially along the inner periphery of outer housing 12. Optical film 14 is a thin, flexible film made of a transparent polymeric material having a structured surface and a smooth surface, wherein light striking the smooth surface is totally internally reflected. The structured surface is preferably a linear array of substantially right angled isosceles prisms forming a plurality of peaks and grooves. A preferred film is described in commonly assigned U.S. Pat. No. 4,906,070 to Cobb, Jr. which is hereby incorporated by reference. Optical film 14 is placed within outer housing 12 such that the grooves run parallel to the longitudinal axis of outer housing 12. The structured surface of optical film 14 is the outer surface of the tubular optical film.

Figure 1A:
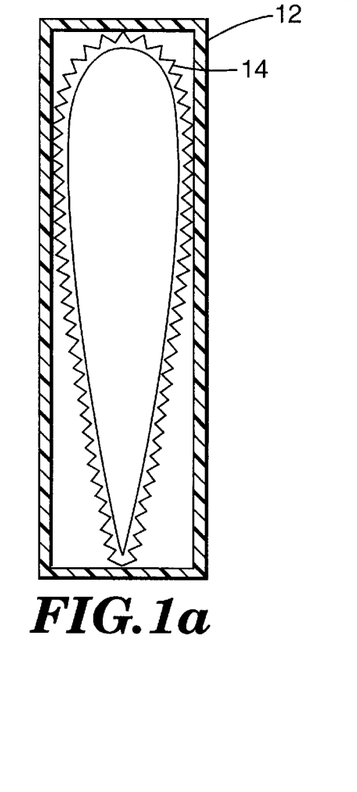
FIGS. 1a and 1b are side cross-sectional views showing alternative configurations of optical film for guidance applications.
Figure 1B:
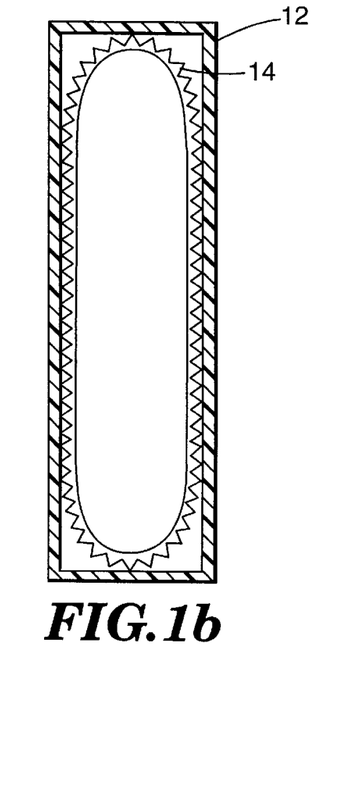

Totally internally reflecting films have been used in tubular forms with a circular cross-sectional shape to take advantage of their superior light transport characteristics, to allow maximum distances between light sources. In guidance device 10, however, it is often preferable to use shorter sections of housing. With a shorter section of housing, the goal is not transporting light over long distances, but rather to emit more light from guidance device 10. Therefore, outer housing 12 has a narrow cross-section to increase the number of reflections light rays make with optical film 14. With a rectangular cross-section, as shown in FIG. 1, optical film 14 may be placed within outer housing in a number of ways. For example, as shown in FIG. 1, optical film 14 may lie substantially along the longer wall of the rectangular cross section and curve to the opposite long wall near each of the shorter walls of the housing. FIG. 1a shows another possible placement of optical film 14 substantially along the interior of outer housing 12, where optical film 14 has a teardrop shaped cross-section. FIG. 1b shows yet another possible cross-sectional shape of optical film 14, an oval. Further, the cross-sectional shape of optical film 14 further is dictated by the properties of optical film 14. Those skilled in the art will readily recognize that numerous shapes and combinations of shapes exist for outer housing 12 and optical film 14 to increase the number of reflections light rays make within guidance device 10 for the purposes of the present invention.

A light source is located at one end of guidance device 10 to provide illumination to the device. For lighted guidance tubes, highly collimated halogen light sources are often used to illuminate as great a length of tube as possible. The highly collimated halogen light sources, however, have low efficiency and a short life. For applications where illuminated guidance devices are placed in remote locations, it is desirable to use light sources and power sources that do not need to be replaced very frequently. Therefore, a light source having high efficiency and long life is needed. Referring back to FIG. 1, a plurality of light emitting diodes (LEDs) 16 are placed at the end of guidance device 10 to provide illumination. LEDs 16 are preferably angled at optical film 14 to increase the number of reflections by optical film 14 over the number that would occur if light rays from LEDs 16 were substantially parallel to the longitudinal axis of outer housing 12. While the positioning angle of LEDs 16 varies with the length of guidance device 10 and the beam spread of LEDs 16, a preferred range of angles is between five and twenty degrees. Because some light escapes from guidance device 10 at each reflection, increasing the number of reflections allows shorter sections of guidance device 10 to use less intense light sources and still appear as bright as longer guidance devices lit with high intensity lamps. LEDs 16 are further preferable as light sources for the present invention because of their high efficiency and long life. For example, if 30 milliwatt LEDs are used, approximately 8 to 16 LEDs, depending on the illumination desired, are preferably used to illuminate a six meter length of guidance device 10. LEDs have a life on the order of 50–100,000 hours, thereby eliminating of the need to replace the light source frequently. Further, in another embodiment of the present invention, LEDs 16 may be strobed at a high rate, for example, 50 to 1000 times per second, thereby conserving battery life without causing any perceivable flicker.

Figure 6:
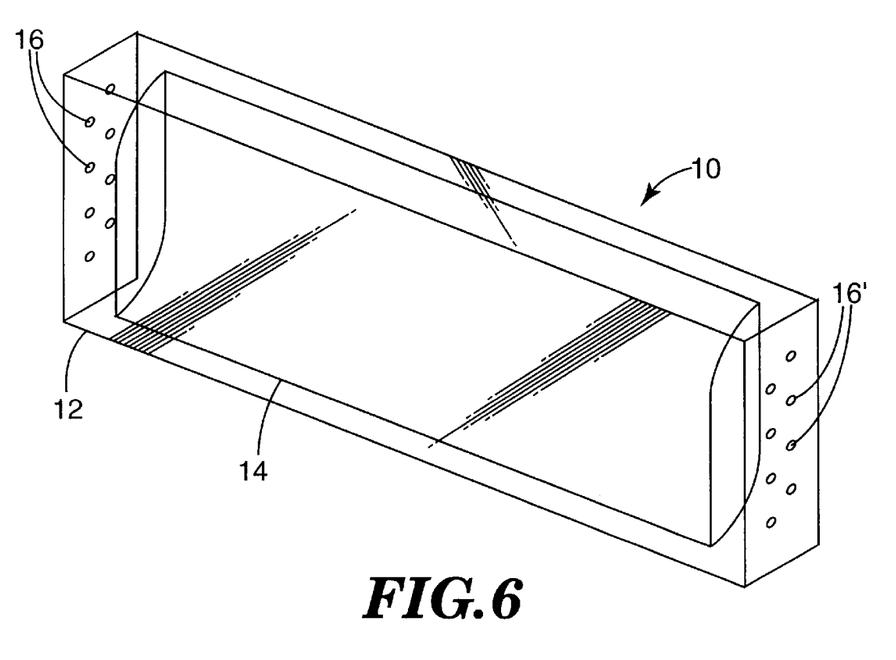
FIG. 6 shows a perspective view of the present invention showing light source at both ends of the lighted marking device.

To further increase the number of reflections within guidance device 10 and thereby increase its illumination, reflective sheeting 18 is placed on both inside ends of outer housing 12 to reflect light back down inside the optical film 14. Preferably, 3M brand Silverlux, manufactured by Minnesota Mining and Manufacturing Company, St. Paul, Minn., an opaque reflective sheeting, is used for reflecting the light. As shown in FIG. 6, at the other end of guidance device 10, another set of LEDs 16 may be used such that light is provided from both ends of guidance device 10. Alternatively, only reflective sheeting is used.

In lighted idance tube applications, power is typically provided to the lighted guidance tubes by means of electrical wiring, which causes problems when the lighted guidance tubes are installed in remote areas or only short delineation systems are required. Therefore, to provide power for the light source, battery 19 may be included within guidance device 10 to make guidance device 10 completely self-contained. Battery 19 is preferably a long life alkaline battery, although any battery may be used. A preferred alkaline battery provides several weeks of continuous operation. Photovoltaic cell 20 may also be included to recharge battery 19, such as a nickel cadmium or other rechargeable battery, when cell 20 is exposed to radiant energy. Photovoltaic cell 20 in combination with a rechargeable battery can provide substantially unlimited continuous operation in sunny environments.

Figure 2:
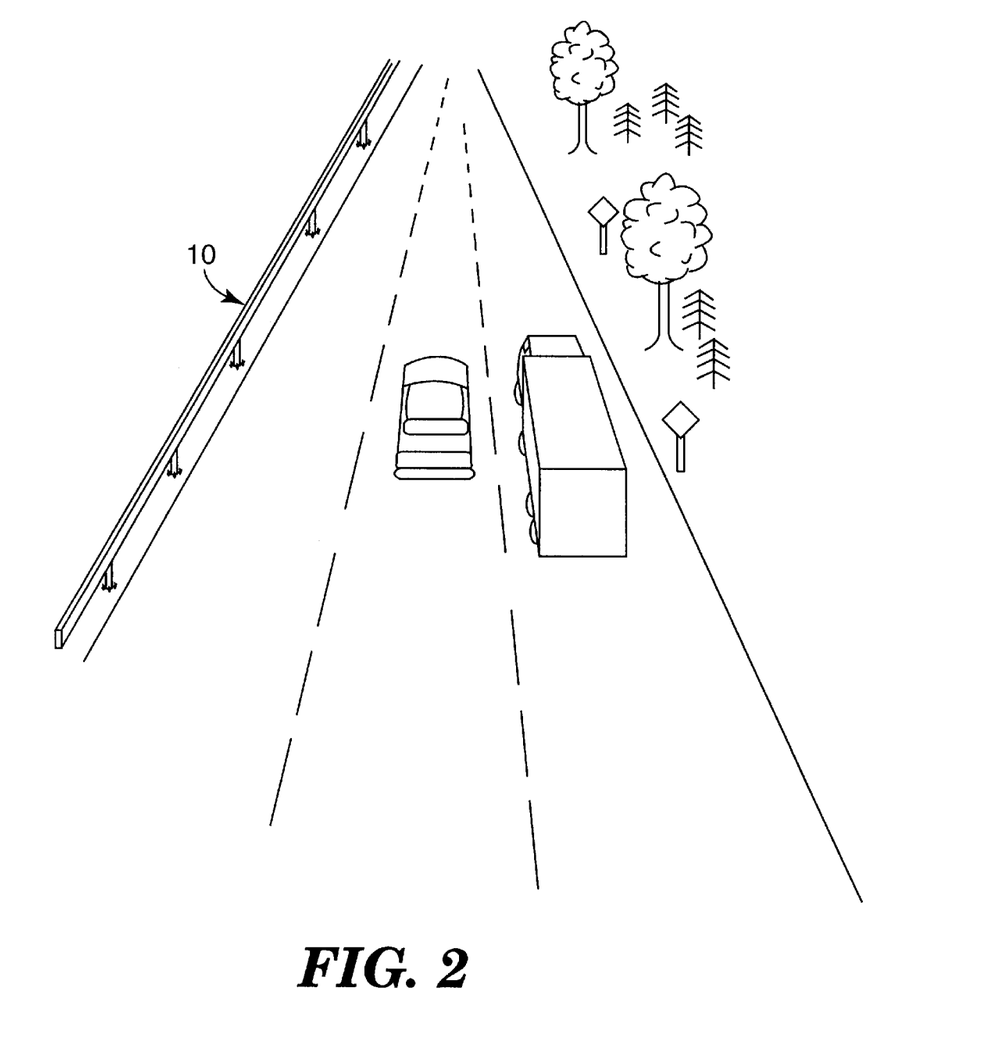
FIG. 2 is a perspective view of a roadway with the present invention installed on the roadside.

FIG. 2 is a perspective view of a roadway having guidance device 10 installed on the roadside. Guidance device 10 is particularly useful to delineate the side of the road, as shown in FIG. 2, traffic lanes or other obstacles that vehicles may encounter along the roadway. Guidance device 10 is a directionally dependent line light source, emitting light at shallow angles, preferably on the order of zero to twenty degrees from the longitudinal axis of guidance device 10, with virtually no light emitted at near perpendicular angles. Therefore, motorists travelling on roadways delineated with guidance devices will see distant sections of the guidance devices that the motorists are approaching while sections of the guidance devices near and to the side of the motorists will become dim and hardly visible. This minimizes distraction and glare from the side. Conversely, non-directional light sources, such as fluorescent tubes, used in this type of application appear brightest to the side of the motorist, increasing glare and distraction. Thus, guidance device 10 only directs light to where it needs to be seen, specifically, toward drivers of vehicles on the roadway.

Figure 3:
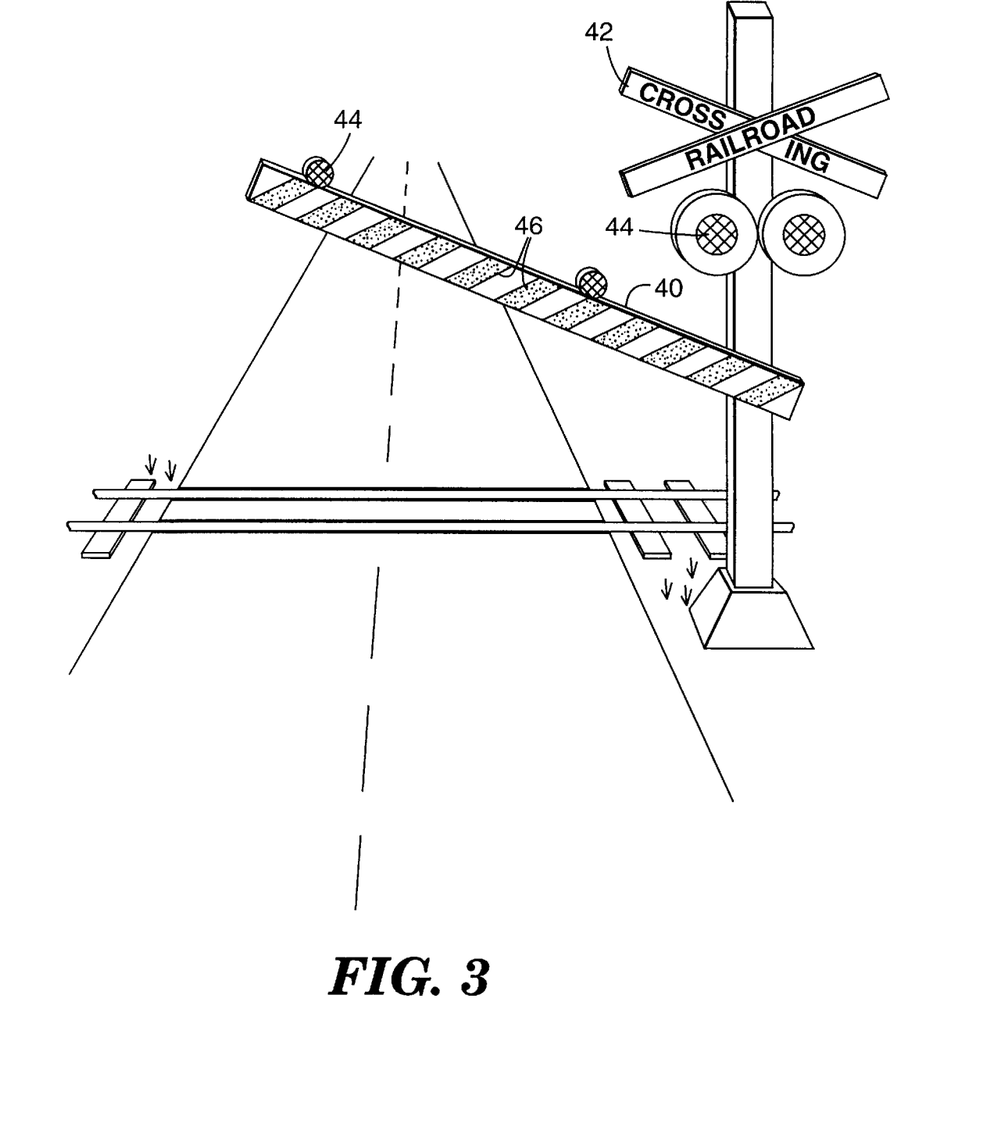
FIG. 3 is a perspective view of a railroad crossing.

Referring to FIG. 3, a railroad crossing is shown. Railroad crossings are typically marked with signs 42, gate arms 40, marked with diagonal stripes, alternating red and white, and steady burning lights 44. Signs 42 typically are painted, or more preferably, have retroreflective sheeting on their face to improve their visibility to drivers at night. Lights 44 caution drivers as well as provide illumination to further alert drivers that an obstacle is present in the roadway. White stripes 46 are also typically white retroreflective sheeting to define the general length of the gate arm at night.

Figure 4:
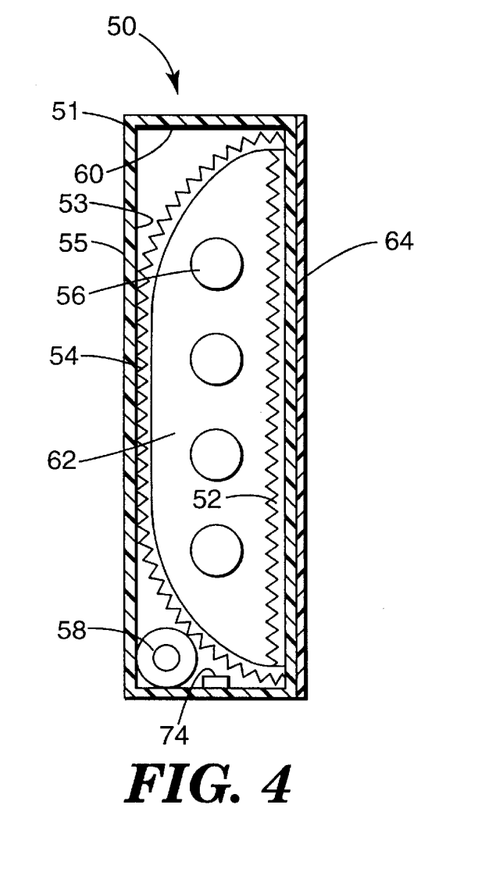
FIG. 4 is a side cross-sectional view of the present invention configured for marking applications.

FIG. 4 shows a cross-sectional view of the present invention when used for marking applications. Outer housing 51 of marking device 50 is tubular in form and preferably has a rectangular cross-section, although any narrow cross-sectional shape may be used. Outer housing 51 is substantially transparent and is preferably made of polycarbonate. Housing 21 has a first face 55 and a second face 53. Light extractor film 52 has a smooth surface and a structured surface, the structured surface having a plurality of linear prisms facing the interior second face 53 of outer housing 51. In a preferred embodiment, the prisms of light extractor film 52 form isosceles triangles having an angle of 69°. This angle is selected because it causes light traveling at an angle of 15° to the longitudinal axis of outer housing 51 to be emitted in a direction normal to that axis and through face 64. Those skilled in the art will readily recognize, however, that the exact angle of the isosceles triangles may vary without significantly affecting the light extraction performance of light extractor film 52, depending on a variety of variables, such as the position of the light source, its characteristics and the index of refraction of the extractor film. Therefore, a preferred range of angles for the isosceles triangles of light extractor film 52 ranges between 59° and 79°. Moreover, triangles other than isosceles triangles may be used to extract light. Light extractor film 52 is placed along the front inner face of outer housing 51 such that light striking light extractor film 52 exits perpendicular the longitudinal axis of outer housing 51, as opposed to the shallow angles of guidance device 10 as shown in FIG. 1.

Optical film 54, a microstructured film that totally internally reflects light, is placed behind right angle film 52. A preferred optical film is described in the aforementioned U.S. Pat. No. 4,906,070 to Cobb Jr. Light is provided by light source 56, preferably a plurality of light emitting diodes (LEDs). LEDs are preferred because of their low power consumption, high efficiency and long life. Light source 56 may be powered by battery 58, photovoltaic cell 60 or a combination thereof. Light source 56 is angled with respect to the longitudinal axis of outer housing such that light rays from light source 56 will approach light extractor film 52 at an angle between 1 and 40 degrees and preferably between 7 and 20 degrees. Optical film 54 transports light from light source 56 along the length of outer housing 51 while light extractor film 52 directs it perpendicularly out the front face of outer housing 51. Because light is extracted from marking device 50, there is not as much light for optical film 54 to transport. Therefore, it is preferable to include LEDs at both ends of marking device 50. Also, reflective sheeting 62, such as 3M brand Silverlux, may be placed at the ends of marking device 50 to reflect light back within outer housing 51 that has not yet been extracted by light extractor film 52. Marking device 50 is particularly useful for marking applications where the potential viewer will approach marking device 50 in a direction perpendicular to the length of marking device 50. When the potential viewer approaches from such a direction, light from marking device 50 will be directed at the viewer.

Figure 4A:
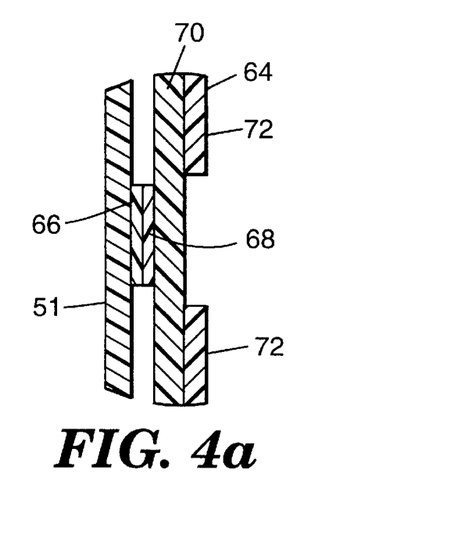
FIGS. 4a and 4b are blown-up cross-sectional views of two alternative embodiments of a portion of the face of the embodiment shown in FIG. 4.

Referring to FIG. 4a, face 64 will be described in more detail. FIG. 4a shows a cross sectional view of a portion of face 64. Face 64 may be included in marking device 50 to give marking device 50 an efficient light distribution system as well as an aesthetic appearance similar to traditional marking devices. Face 64 substantially consists of translucent retroreflective sheeting 70, such as Scotchlite Reflective Sheeting Diamond Grade Series 3970, manufactured by Minnesota Mining and Manufacturing Company, St. Paul, Minn. Retroreflective sheeting 70 provides nighttime visibility by redirecting light from the headlights of a vehicle back to the motorist. Because the retroreflective sheeting 70 is also translucent, light extractor film 52 directs light through retroreflective sheeting 70 towards the motorist. Motorists in an approaching vehicle can see the transmitted light before the vehicle is close enough for retroreflection of the vehicle's headlights, or when dew, frost, fog, or other environmental conditions interferes with the retroreflection light path. Further, in applications where selective illumination is desired, such as a railroad gate arm marking device 50 may be controlled by switch 74, such as a mercury switch, such that marking device 50 only illuminates when the gate is lowered.

Railroad gate arms or construction barriers, often have striped faces, for example, alternating diagonal red and white stripes, as shown in FIG. 3. In such an embodiment, red LEDs may be used to provide the color for the red stripes. Colored layer 72 is placed in front of retroreflective sheeting 70 to give face 64 a colored appearance. Colored layer 72 consists of a durable, transparent, colored film, such as Scotchlite Electronic Cuttable Overlay Film Series 1170, manufactured by Minnesota Mining and Manufacturing Company, St. Paul, Minn. Colored layer 72 can also be a silk-screen printed transparent ink. For example, to give face 64 a red and white striped appearance, red stripes of colored layer 72 would be added to the retroreflective sheeting, and would transmit the red LED light. The white areas, however, would also transmit the red LED light. Transmission of red light through areas desired to be white may be prevented in different ways. A first method is to include two additional layers between retroreflective sheeting 70 and outer housing 51 of marking device 50 as shown in FIG. 4a. Reflective sheeting 66 reflects red LED light back into outer housing 51, and white, electronically cuttable, durable, vinyl film 68, such as Scotchcal series 7725 ElectroCut Film, manufactured by Minnesota Mining and Manufacturing, St. Paul, Minn., to give daytime whiteness to the white segments of face 64. At night, however, face 64 will appear red and black when internally illuminated, and red and white when light is retroreflected off retroreflective sheeting 70.

Figure 4B:
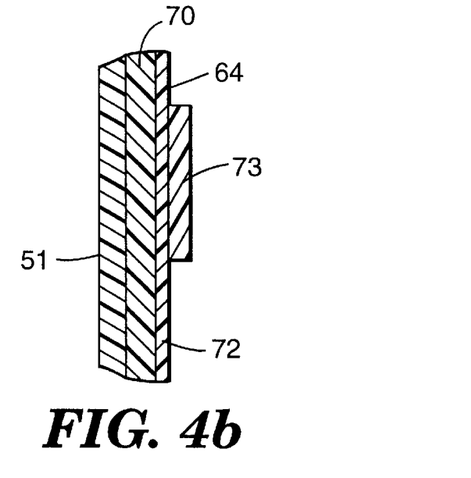

Referring to FIG. 4b, an alternate embodiment of face 64 is shown for preventing transmission of red light through areas desired to be white. In FIG. 4b, colored layer 72 is placed over the entire face of retroreflective sheeting 70. An opaque retroreflective sheeting layer 73 is placed over colored layer 72. Opaque retroreflective sheeting 73 will retroreflect light, thereby giving it a white appearance. At night, similar to the first method, face 64 will appear red and black when internally illuminated, and red and white when light is retroreflected off opaque reflective sheeting 73. This method simplifies assembly of face 64 by eliminating the need for careful alignment of the different layers. Yet another method of providing a striped appearance would be to use white LEDs in FIG. 4a and exclude the additional reflective sheeting 66 and vinyl film 68. Using such a method, the entire face would be translucent, allowing multi-colored faced to be illuminated.

Figure 5:
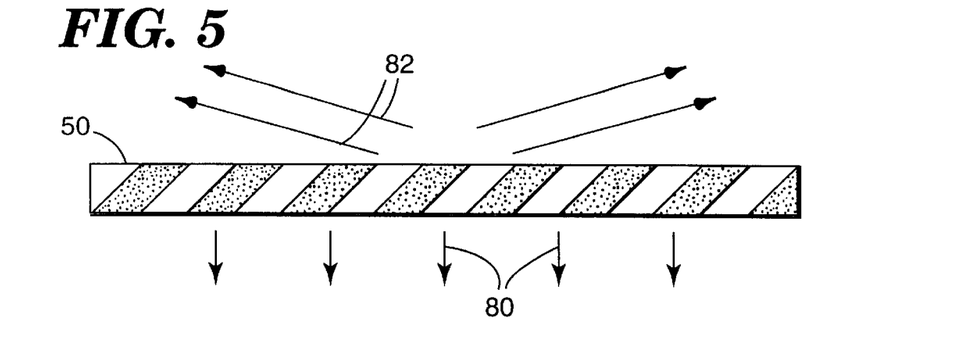
FIG. 5 shows the present invention configured as a railroad gate arm and further shows the angles light is emitted from the front and back faces of the gate arm.

FIG. 5 shows marking device 50 configured as a railroad gate arm and shows an additional benefit of the embodiment shown in FIG. 4. Light extractor film 52 directs light rays 80 perpendicularly out of the face of marking device 50 and at incoming drivers. Referring back to FIGS. 1 and 4, optical film 54 of parking device 50 directs light similarly to optical film 14 of guidance device 10. Thus, light rays 82 from the other side of marking device 50, are emitted at shallow angles and are directed at oncoming trains. Therefore, marking device 50 not only provides an illuminated barrier to alert vehicles of an oncoming train, it also provides an illuminated barrier to oncoming trains to assist them in locating the crossing area at night.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

What is claimed is:

1. A self-contained lighted marking apparatus comprising:
   a substantially transparent housing having a longitudinal axis running from a first end of said housing to a second end of said housing, said housing having a narrow cross-section, one dimension of said cross-section being greater than a second dimension;
   a plurality of light emitting diodes for providing light within said housing, said plurality of light emitting diodes located at said first end of said housing;
   means for providing power for said plurality of light emitting diodes; and
   a thin, flexible film substantially located along inner periphery of said housing, said film having a totally internally reflected smooth surface on one side of the film and a plurality of linear substantially right angled isosceles prisms forming a plurality of peaks and grooves on another side of the film, each of said grooves of said prisms having an axis, said axes of said prisms running parallel to said longitudinal axis of said housing.

2. The self-contained lighted marking apparatus according to claim 1, further comprising a second plurality of light emitting diodes for providing light within said housing, said second plurality of light emitting diodes located at said second end of said housing.

3. The self-contained lighted marking apparatus according to claim 1, wherein said light emitting diodes are strobed at a high rate.

4. The self-contained lighted marking apparatus according to claim 1, wherein said light emitting diodes are positioned to provide light at an angle to said axes of said prisms of said film.

5. The self-contained lighted marking apparatus according to claim 4, wherein said angle is between 5 and 20 degrees.

6. The self-contained lighted marking apparatus according to claim 1, further comprising reflecting means located at said first and second ends of said housing for reflecting incident light within said housing.

7. The self-contained lighted marking apparatus according to claim 1, wherein said means for providing power comprises a photovoltaic cell for producing voltages when exposed to radiant energy.

8. The self-contained lighted marking apparatus according to claim 7, further comprising storage means for storing energy generated from said photovoltaic cell and for providing power for said light emitting diodes.

9. The self-contained lighted marking apparatus according to claim 1, wherein said film has an oval cross-sectional shape.

10. The self-contained lighted marking apparatus according to claim 1, wherein said film has a teardrop cross-sectional shape.

11. A self-contained lighted marking apparatus comprising:
    a substantially transparent housing having a longitudinal axis running from a first end of said housing to a second end of said housing, said housing having a narrow substantially rectangular cross-section and a first face and a second face;
    a plurality of light emitting diodes for providing light within said housing, said plurality of light emitting diodes located at said first end of said housing;
    means for providing power for said plurality of light emitting diodes;
    a light extractor for directing light out of said first face of said housing, said light extractor having a first smooth side and a second structured side, said second structured side having a plurality of linear prisms thereon facing the interior of the housing, each of said prisms having first and second sides; and
    a thin, flexible film substantially located along inner periphery of said second face of said housing, said film having a smooth surface on one side of the film and a plurality of linear substantially right angled isosceles prisms on another side of the film, each of said prisms having an axis, said axes of said prisms running parallel to said longitudinal axis of said housing.

12. The self-contained lighted marking apparatus according to claim 11, wherein said first and second side of each said prisms of said light extractor make an angle in the range of 59 to 79 degrees with one another.

13. The self-contained lighted marking apparatus according to claim 11, wherein said marking apparatus further comprises retroreflective sheeting on the outside of said first face of said housing.

14. The self-contained lighted marking apparatus according to claim 11, wherein said light emitting diodes are angled at said film.

15. The self-contained lighted marking apparatus according to claim 11, further comprising switching means for selectively providing power to said light source.

16. A self-contained lighted marking apparatus having a first color on first portions and a second color on second portion, said marking apparatus comprising:
    a substantially transparent housing having a longitudinal axis running from a first end of said housing to a second end of said housing, said housing having a narrow substantially rectangular cross-section and a first outer face and a second outer face;
    a light source for providing light within said housing, said light source located at said first end of said housing;
    a light extractor for directing light out of said first outer face of said housing, said light extractor having a first smooth side and a second structured side, said second structured side having a plurality of linear prisms thereon facing the interior of the housing, each of said prisms having first and second sides;
    a thin, flexible film substantially located along interior periphery of said second outer face of said housing, said film, having a smooth surface on one side of the film and a plurality of linear right isosceles prisms on another side of the film, each of said prisms having an axis, said axes of said prisms running parallel to said longitudinal axis of said housing;
    retroreflective sheeting having a first face and a second face, said second face of said retroreflective sheeting adjacent said first face of said housing;
    coloring means for providing said first color at said first portions of said marking apparatus, said coloring means adjacent said first face of said retroreflective sheeting at said first portions; and
    means for providing said second color, said means for providing said second color being adjacent said second face of said retroreflective sheeting at said second portions of said marking apparatus.

17. The self-contained lighted marking apparatus according to claim 16, further comprising reflective sheeting having a first face and a second face, said first face of said reflective sheeting adjacent said means for providing said second color and said second face of said reflective sheeting adjacent said first outer face of said housing.

18. A self-contained lighted marking apparatus having a first color on first portions and a second color on second portion, said marking apparatus comprising:

a substantially transparent housing having a longitudinal axis running from a first end of said housing to a second end of said housing, said housing having a narrow substantially rectangular cross-section and a first outer face and a second outer face;

a light source for providing light within said housing, said light source located at said first end of said housing;

a light extractor for directing light out of said first outer face of said housing, said light extractor having a first smooth side and a second structured side, said second structured side having a plurality of linear prisms thereon facing the interior of the housing, each of said prisms having first and second sides;

a thin, flexible film substantially located along interior periphery of said second outer face of said housing, said film having a smooth surface on one side of the film and a plurality of linear right isosceles prisms on another side of the film, each of said prisms having an axis, said axes of said prisms running parallel to said longitudinal axis of said housing;

retroreflective sheeting having a first face and a second face, said second face of said retroreflective sheeting adjacent said first face of said housing;

coloring means for providing said first color, said coloring means adjacent said first face of said retroreflective sheeting at said first portions; and means for providing said second color, said means for providing said second color being adjacent said coloring means at said second portions of said marking apparatus.

19. The self-contained lighted marking apparatus according to claim 18, wherein said means for providing said second color comprises opaque retroreflective sheeting.

20. A self-contained lighted marking apparatus comprising:

a substantially transparent housing having a longitudinal axis running from a first end of said housing to a second end of said housing, said housing having a narrow cross-section;

a light source for providing light within said housing, said light source located at said first end of said housing;

a thin, flexible film substantially located along inner periphery of said housing, said film having a totally internally reflected smooth surface on one side of the film and, a plurality of linear substantially right angled isosceles prisms forming a plurality of peaks and grooves on another side of the film, each of said grooves of said prisms having an axis, said axes of said prisms running parallel to said longitudinal axis of said housing; and reflecting means located at said first and second ends of said housing for reflecting incident light within said housing.

* * * * *

UNITED STATES PATENT AND TRADEMARK OFFICE
CERTIFICATE OF CORRECTION

PATENT NO. : 6,164,782
DATED : December 26, 2000
INVENTOR(S) : Pojar, Stephen J.

It is certified that error appears in the above-identified patent and that said Letters Patent is hereby corrected as shown below:

Column 2,
Line 27, "and" should be deleted;
Line 30, "." should read -- ; and --;
Line 32, "source" should read -- sources --;

Column 4,
Line 6, "16" should read -- 16' --; and
Line 9, "idance" should read -- guidance --.

Signed and Sealed this

Fourteenth Day of October, 2003

JAMES E. ROGAN
*Director of the United States Patent and Trademark Office*